No. 885,449. PATENTED APR. 21, 1908.
S. J. DAVIS.
FRICTION CLUTCH MECHANISM.
APPLICATION FILED DEC. 26, 1906.
2 SHEETS—SHEET 1.
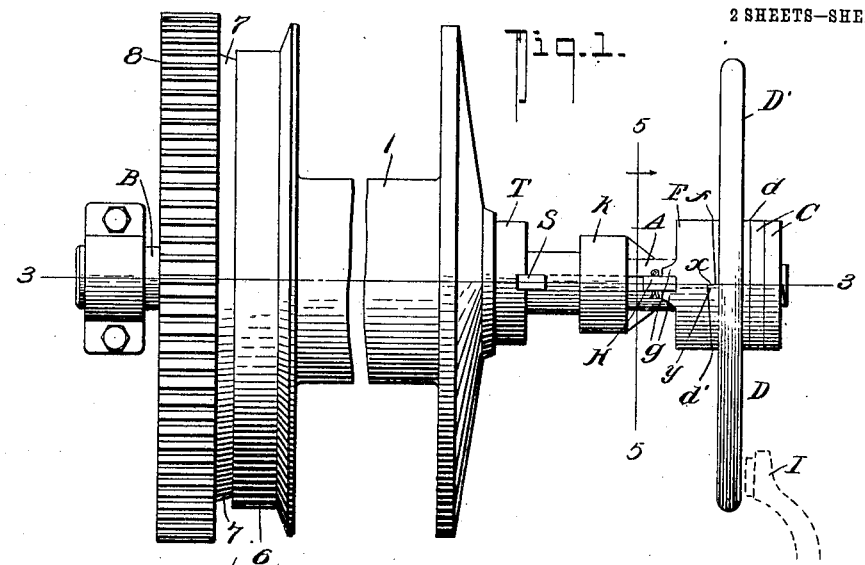
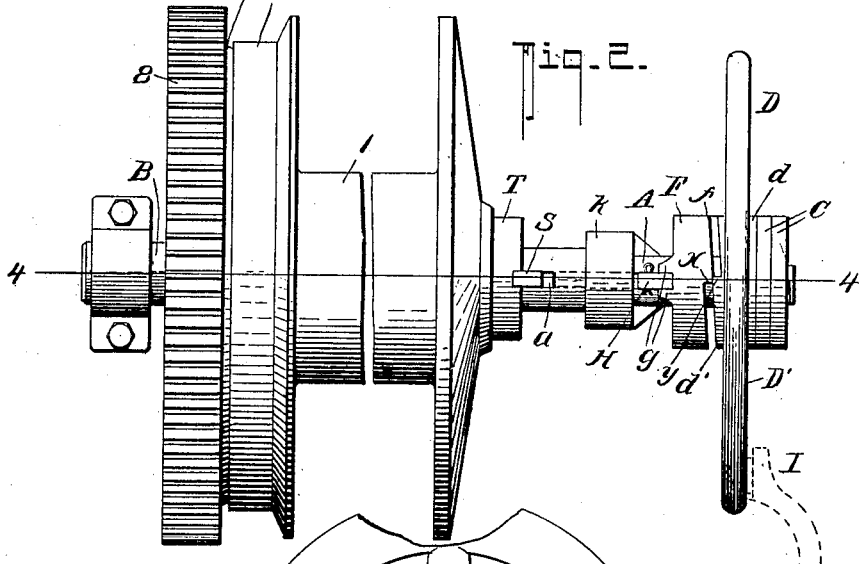
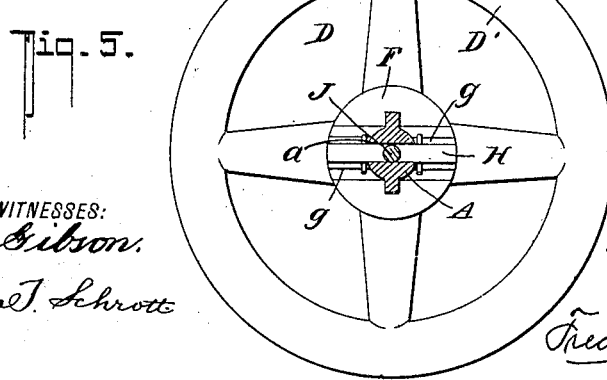
WITNESSES:
INVENTOR
Spurgen J. Davis.
BY
Fred G. Dieterich
ATTORNEYS

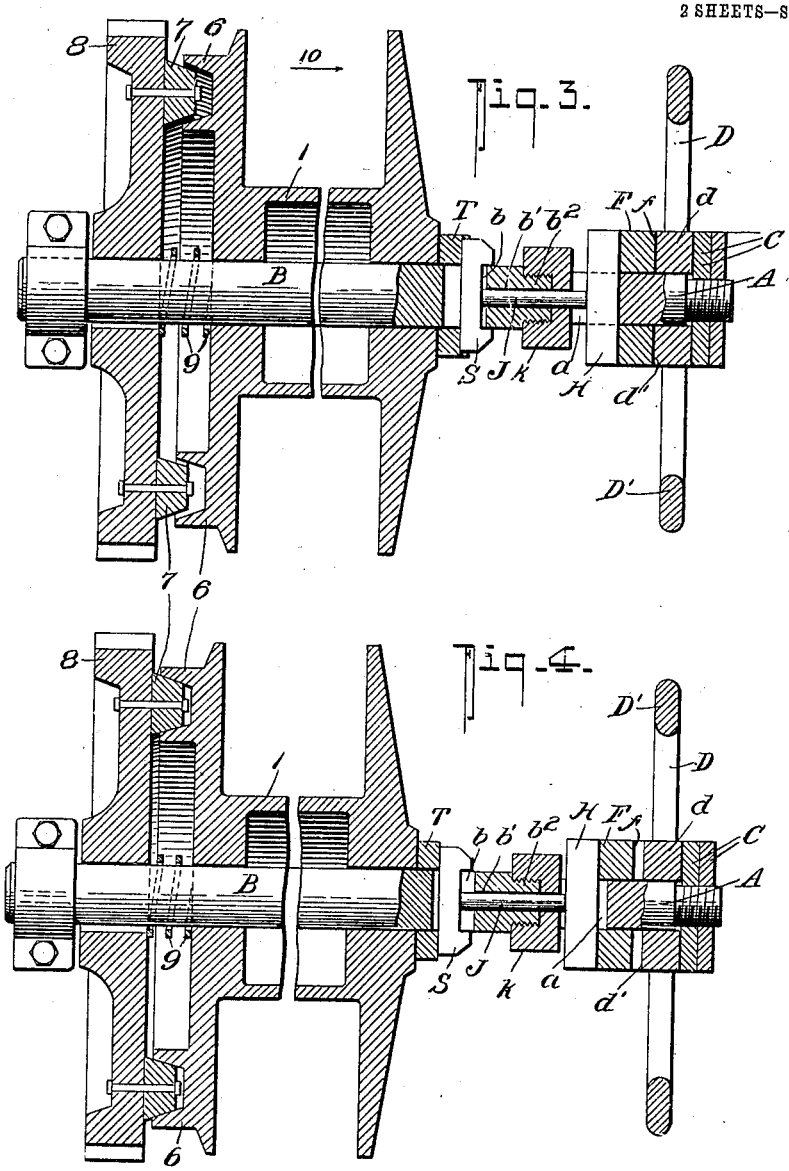

UNITED STATES PATENT OFFICE.

SPURGEON J. DAVIS, OF OSTRANDER, WASHINGTON.

FRICTION-CLUTCH MECHANISM.

No. 885,449.      Specification of Letters Patent.      Patented April 21, 1908.

Application filed December 26, 1906. Serial No. 349,473.

*To all whom it may concern:*

Be it known that I, SPURGEON J. DAVIS, residing at Ostrander, in the county of Cowlitz and State of Washington, have invented a new and Improved Friction-Clutch Mechanism, of which the following is a specification.

My present invention, which relates to improvements in friction clutch mechanisms for hoisting logging and other engines, more particularly refers to that class of mechanisms shown in my Patents Nos. 754644 dated Nov. 15, 1904 and 825521 dated July 10, 1906, and which in the general construction include a drum, a clutch slidably mounted on the power shaft to rotate therewith, means for shifting said clutch member, whereby to actuate the controlling device for operating the drum, and my present invention primarily seeks to provide a clutch mechanism of the general type referred to, of a simple and economical construction, easily manipulated, of few parts and having such correlation whereby they will not readily get out of order or broken.

My present invention comprehends generally a clutch member rotatable with and slidable upon a drum, mechanism coöperatively connected with the drum, actuated by the setting of the clutch for starting the said drum and a clutch member rotatable with the drum shaft and loosely mounted thereon, brake mechanism for retarding the momentum of the movable clutch member whereby to set the sliding clutch and means for adjusting the lateral thrust of the rotatable clutch member.

In its more subordinate features, my invention consists in certain details of construction and peculiar combination of parts, all of which will be hereinafter fully explained, pointed out in the appended claims and illustrated in the accompanying drawings, in which:—

Figure 1, is a plan view of my improvement, the clutch devices being shown in position for releasing the drum. Fig. 2, is a similar view, the parts being adjusted to show the drum applied. Fig. 3, is a vertical longitudinal section on the line 3—3 on Fig. 1. Fig. 4, is a similar view on the line 4—4 on Fig. 2. Fig. 5, is a transverse section on the line 5—5 on Fig. 1.

In carrying out my present invention, I arrange the drum spool 1 loosely on the drum shaft B and provide said spool with a clutch flange 6, adapted to be moved in the manner presently explained, into tight frictional contact with the clutch flange 7 of the drive gear 8 and to free the drum flange 6 from the gear flange 7, a spring 9 is mounted on the drum shaft that normally forces the drum in the direction indicated by the arrow 10 on Fig. 3.

The drum shaft B, at a point adjacent the head or end of the drum has an elongated slot $b$ in which plays a key $s$, which bears against an actuating rod J, slidably mounted in the central bore $b'$ formed in the outer end of the drum shaft B, as clearly shown in Fig. 3, by reference to which it will be also seen that the outer end of the drum shaft has a reduced threaded portion $b^2$ upon which is fitted an extension A that forms a continuation of the drum shaft B and it has an enlarged head $k$ for engaging a bearing in the framing. The threaded end of the extension A is transversely slotted as at $a$ to receive a key H, whose opposite ends project beyond the shaft and which abuts the outer end of the rod J.

F designates the shiftable clutch member, held on the shaft extension A, and slidable thereon. At the side adjacent the key H, the member F has outwardly projected lugs $g$—$g$ that straddle the ends of the said key and the other or clutch face $f$ is held to engage with the opposing clutch face $d'$ formed in the hub $d$ of a grip wheel D, loosely mounted on the outer end of the shaft extension A, which has its extremity threaded as at $a'$ to receive the adjusting or screw nuts or disks C—C which hold the wheel D from lateral movement on the shaft member A.

I designates a brake shoe, actuated in any well known manner, that engages the rim $D'$ of the grip wheel and which may be applied at desired times in any well-known manner.

From the foregoing, taken in connection with the accompanying drawings, the complete structure and the method of operation of my invention will be readily apparent, since to apply the drum, it is only necessary to press the brake against the rim of wheel D to retard its motion and cause it to come to a stop while the shaft continues nearly half of its clutch movement, the clutch member going with it, which separates the two opposing clutch points $x$ and $y$, and thereby slides the clutch member F laterally to the position shown in Fig. 2 which also moves the key H and with it the rod J, which in turn forces the cross key S into engagement with the cross seat in the drum collar T and thereby puts in motion the said drum and applies the clutch rims 6 and 7.

When clutch points $x$ and $y$ are at their most separated position, as shown in Fig. 2 the brake on wheel D is released which then allows all parts to revolve together. To release the drum, the grip wheel is again retarded until the clutch point $y$ passes the other point $x$, when the spring 9 on drum shaft shifts the drum, the rod J and the key H back to the position shown in Fig. 1 when the parts will again revolve together with the drum loose.

By reason of the peculiar construction and combination of parts shown and described, a compact and stable construction of parts is provided, capable of easy operation, since the engine does its own work. The setting devices revolve with the shaft and the flange or enlargement K will not move endwise against the frame of the engine. The mechanism can be speedily thrown in or out and since but a few parts are used, the mechanism cannot be readily disorganized or refuse to properly and quickly act.

Having thus described my invention, what I claim and desire to secure by Letters Patent, is:—

1. In a clutch mechanism of the character described, the combination with the drum shaft, a drum setting pin or rod mounted for longitudinal movement in said shaft, a cross key engaging the rod, having longitudinal movement through the shaft, the sliding clutch member, engaging with said key, the opposing and rotatable clutch member having radial grip portions, and adjustable members on the shaft for holding the rotatable clutch member from lateral movement.

2. In a clutch mechanism of the character described, the combination with the hollow drum shaft, the slotted shaft extension connected to said shaft, a setting pin or rod mounted within the said hollow and slotted shaft members, a cross key on the slotted shaft, the endwise slidable clutch member on the shaft that engages the cross key, means for normally forcing the setting rod or pin with the key and sliding clutch member outward, a grip wheel loosely mounted on the shaft extension, having a clutch face opposing the sliding clutch face, the outer end of the shaft extension being threaded, and the threaded adjusting member for engaging the threaded end of the shaft extension, all being arranged substantially as shown and described.

3. In a clutch mechanism, in which is included an endwise movable drum, a setting pin mounted within a hollow drum shaft, and a shiftable clutch member mounted on the drum shaft and held in engagement with the setting pin, of a grip wheel loosely mounted on the drum shaft having a clutch member to oppose the sliding clutch and adapted when its movement is retarded to shift the endwise movable clutch member and the setting rod and a means adapted on the shaft for holding the grip wheel from lateral movement on the shaft, as set forth.

4. In a clutch mechanism of the character described, the combination with the hollow drum shaft, a drive gear carried thereby, a drum spool loosely mounted on the said shaft, the spool and gear having coöperating clutch faces, said spool having a clutch collar, a slidable clutch key for engaging said collar and an endwise shiftable setting pin or rod connected to said collar mounted in the hollow shaft; of the cross key, movable longitudinally in the shaft and held in engagement with the setting rod, the sliding clutch member F, the grip wheel D, loosely mounted on the drum shaft and having a clutch face for opposing the clutch face of the member F and the adjustable member C—C on the outer end of the drum shaft, as set forth.

SPURGEON J. DAVIS.

Witnesses:
 FRANK H. KNAPP,
 W. SINKS FERGUSON.